United States Patent
Yang et al.

(10) Patent No.: US 10,027,969 B2
(45) Date of Patent: Jul. 17, 2018

(54) PARALLEL DECODER WITH INTER-PREDICTION OF VIDEO PICTURES

(71) Applicant: FREESCALE SEMICONDUCTOR, INC., Austin, TX (US)

(72) Inventors: Hongzhang Yang, Shanghai (CN); Chaofan Huang, Suzhou (CN); Peng Zhou, Shanghai (CN)

(73) Assignee: NXP USA, INC., Austin, TX (US)

( * ) Notice: Subject to any disclaimer, the term of this patent is extended or adjusted under 35 U.S.C. 154(b) by 269 days.

(21) Appl. No.: 14/988,755

(22) Filed: Jan. 6, 2016

(65) Prior Publication Data

US 2017/0019675 A1 Jan. 19, 2017

(30) Foreign Application Priority Data

Jul. 17, 2015 (CN) .......................... 2015 1 0506956

(51) Int. Cl.
*H04N 19/44* (2014.01)
*H04N 19/51* (2014.01)
*H04N 19/70* (2014.01)
*H04N 19/436* (2014.01)

(52) U.S. Cl.
CPC ........... *H04N 19/44* (2014.11); *H04N 19/436* (2014.11); *H04N 19/51* (2014.11); *H04N 19/70* (2014.11)

(58) Field of Classification Search
CPC ...... H04N 19/44; H04N 19/513; H04N 19/53; H04N 19/52; H04N 19/573; H04N 19/66; H04N 19/88; H04N 19/865; H04N 19/61; H04N 19/129; H04N 19/176; H04N 19/186; H04N 19/103; H04N 19/119; H04N 19/159; H04N 19/463; H04N 19/96; H04N 19/147; H04N 19/196; H04N 19/46; H04N 19/597; H04N 19/70; H04N 19/112; H04N 19/167; H04N 19/91; H04N 19/13; H04N 19/174; G06F 17/30445

See application file for complete search history.

(56) References Cited

U.S. PATENT DOCUMENTS

| | | | | |
|---|---|---|---|---|
| 4,858,108 A | * | 8/1989 | Ogawa ................... | G06F 13/126 710/6 |
| 6,138,115 A | * | 10/2000 | Agrawal ........... | G06F 17/30625 382/226 |
| 8,046,373 B2 | * | 10/2011 | Chen .................. | G06F 17/30445 707/713 |
| 8,542,939 B2 | * | 9/2013 | Nystad ................... | H04N 19/96 382/240 |
| 8,743,948 B2 | | 6/2014 | Zhao et al. | |
| 8,837,600 B2 | | 9/2014 | Sullivan | |

(Continued)

*Primary Examiner* — Dramos I Kalapodas
(74) *Attorney, Agent, or Firm* — Charles E. Bergere

(57) ABSTRACT

A parallel decoder for decoding compressed video picture data including inter-coded picture item data with motion vector data. A decoding module decodes picture data stored in a temporary storage. The decoding module includes an inter-prediction module that uses inter-prediction item data to decode an inter-coded picture item by referring to already decoded reference picture item data. The structure of inter-prediction item data in the temporary storage is a function of the positions of corresponding reference picture items. The decoding order of stored inter-prediction item data by the inter-prediction module is prioritized as a function of a decoding order of reference picture item data.

12 Claims, 5 Drawing Sheets

(56) References Cited

U.S. PATENT DOCUMENTS

| | | | |
|---|---|---|---|
| 2008/0056364 A1* | 3/2008 | Lyashevsky | H04N 19/172 375/240.13 |
| 2011/0249755 A1* | 10/2011 | Shibahara | H04N 19/129 375/240.18 |
| 2013/0034171 A1* | 2/2013 | Winken | H04N 19/597 375/240.25 |
| 2013/0039423 A1* | 2/2013 | Helle | H04N 19/197 375/240.13 |
| 2014/0098890 A1* | 4/2014 | Sermadevi | G06T 1/20 375/240.24 |
| 2015/0139334 A1* | 5/2015 | Eregala | H04N 19/96 375/240.24 |
| 2015/0146780 A1* | 5/2015 | Miyoshi | H04N 19/593 375/240.12 |
| 2015/0341642 A1* | 11/2015 | Hendry | H04N 19/13 375/240.02 |
| 2016/0057430 A1* | 2/2016 | Kolesnikov | H04N 19/159 375/240.12 |
| 2017/0094314 A1* | 3/2017 | Zhao | H04N 19/61 |
| 2017/0127090 A1* | 5/2017 | Rosewarne | H04N 19/86 |

\* cited by examiner

PARALLEL DECODER WITH INTER-PREDICTION OF VIDEO PICTURES

BACKGROUND

The present invention is directed to data compression and decompression and, more particularly, to a video decoder that performs inter-prediction processes of pictures in parallel.

Data compression is used for reducing the volume of data stored, transmitted or reconstructed (decoded and played back), especially for video content. Decoding recovers the video content from the compressed data in a format suitable for display. Various standards of formats for encoding and decoding compressed signals efficiently are available. One standard that is commonly used is the International Telecommunications Union standard ITU-T H.264 'Advanced video coding for generic audiovisual services'.

Techniques used in video compression include inter-coding and intra-coding. Inter-coding uses motion vectors for block-based inter-prediction to exploit temporal statistical dependencies between items in different pictures (which may relate to different frames, fields, slices or macroblocks or smaller partitions). The inter-prediction picture item data used for inter prediction decoding includes the motion vector, an index to a reference picture, the relevant block of which has to be decoded before the inter-prediction decoding can be completed, and other data such as the block size. Intra-coding uses various spatial prediction modes to exploit spatial statistical dependencies (redundancies) in the source signal for items within a single picture. Prediction residuals, which define residual differences between the reference picture item and the currently encoded item, are then further compressed using a transform to remove spatial correlation inside the transform block before it is quantized during encoding. Finally, the motion vectors or intra-prediction modes are combined with the quantized transform coefficient information and encoded.

The decoding process involves taking the compressed data in the order in which it is received, decoding the data for the different picture items, and combining the inter-coded and intra-coded items according to the motion vectors or intra-prediction modes. Decoding an intra-coded picture can be done without reference to other pictures. Decoding an inter-coded picture item uses the motion vectors together with blocks of sample values from a reference picture item selected by the encoder.

In a parallel decoder, different dedicated threads are processed simultaneously, for example in a multi-core processor. During decoding an inter-coded picture, the inter-prediction process can start before the reference picture has been completely decoded. However, the gain of speed potential of parallel decoding can be lost if the inter-prediction process is blocked waiting for completion of the reference picture item decoding process.

It would be advantageous to have a parallel decoder for video data in which delay of the inter-prediction process due to waiting for completion of reference picture item decoding is reduced or eliminated.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION

Figure 1:
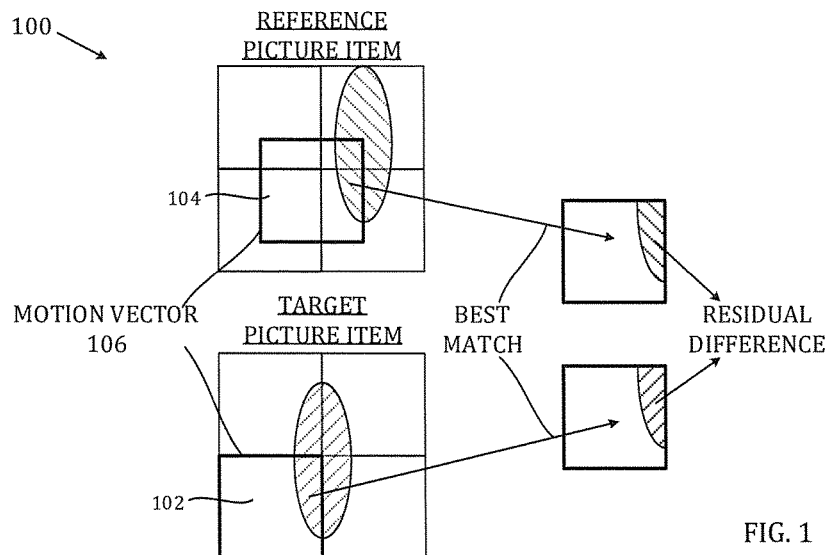
FIG. 1 is a schematic diagram illustrating a conventional process of inter-encoding picture item data during compression of video picture data.

FIG. 1 illustrates a conventional method 100 of compressing a current picture item using inter-prediction, such as in the ITU-T standard H.264 AVC. In the method 100, instead of directly encoding raw picture data for each block 102 of the picture, the encoder tries to find a reference block 104 containing pixels similar to the block it is encoding. Displacement of the current position of the block 102 in the frame relative to the position of the reference block 104 is defined by a motion vector 106. Minor residual differences between the block 102 being encoded and the reference block 104, such as change in luminance or color illustrated by the difference in shading of the blocks 102 and 104, are summarized by prediction error data that is typically transmitted to the decoder as well. The volume of picture data is reduced, since it is unnecessary to transmit and decode again the raw picture data for the reference block 104. However, the reference picture block 104 must be previously decoded before the inter-prediction picture block 102 can be decoded and delay in decoding the reference block 104 can block the decoding process.

Figure 2:
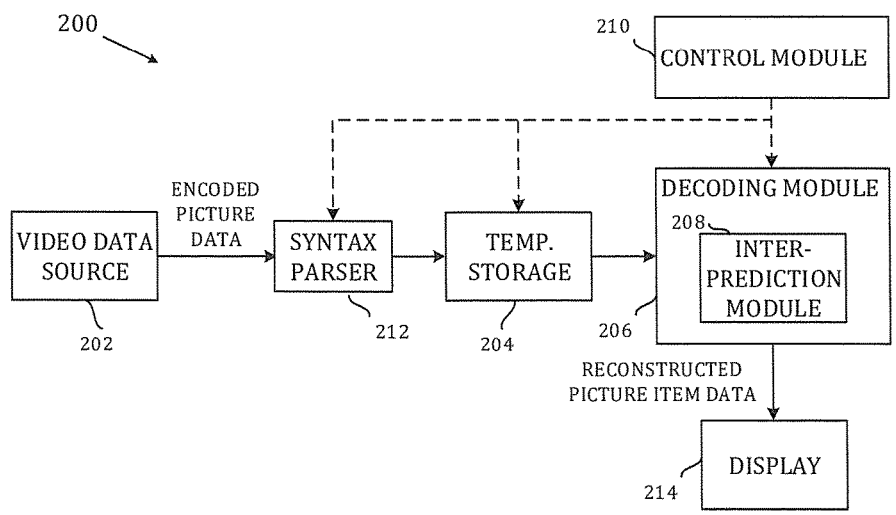
FIG. 2 is a schematic block diagram of a parallel decoder for decoding compressed video picture data in accordance with an embodiment of the invention.

The present invention is applicable to pictures encoded in compliance with the standard H.264 AVC and also other standards. FIG. 2 illustrates a parallel decoder 200 for decoding compressed video picture data in accordance with an embodiment of the invention. The decoder 200 decodes compressed video picture data from a source 202, including inter-coded picture item data 102 with motion vector data 106. The decoder 200 comprises a temporary storage 204 for storing a plurality of structures of picture data to be decoded including structures to organize inter-prediction items. At least one decoding module 206 decodes the stored picture data. The decoding module 206 includes at least one inter-prediction module 208 that uses inter-prediction item data to decode an inter-coded picture item by referring to already decoded reference picture item data 104. A control module 210 controls the structure of inter-prediction item data in the temporary storage 204 as a function of positions in a decoding order of corresponding reference picture items 104, and prioritizes a decoding order of stored inter-prediction item data by the inter-prediction module 208 as a function of the decoding order of reference picture item data 104. The decoded picture data from the decoding module 206 can be reconstructed in a format suitable for displaying on a display screen 214.

Figure 4:
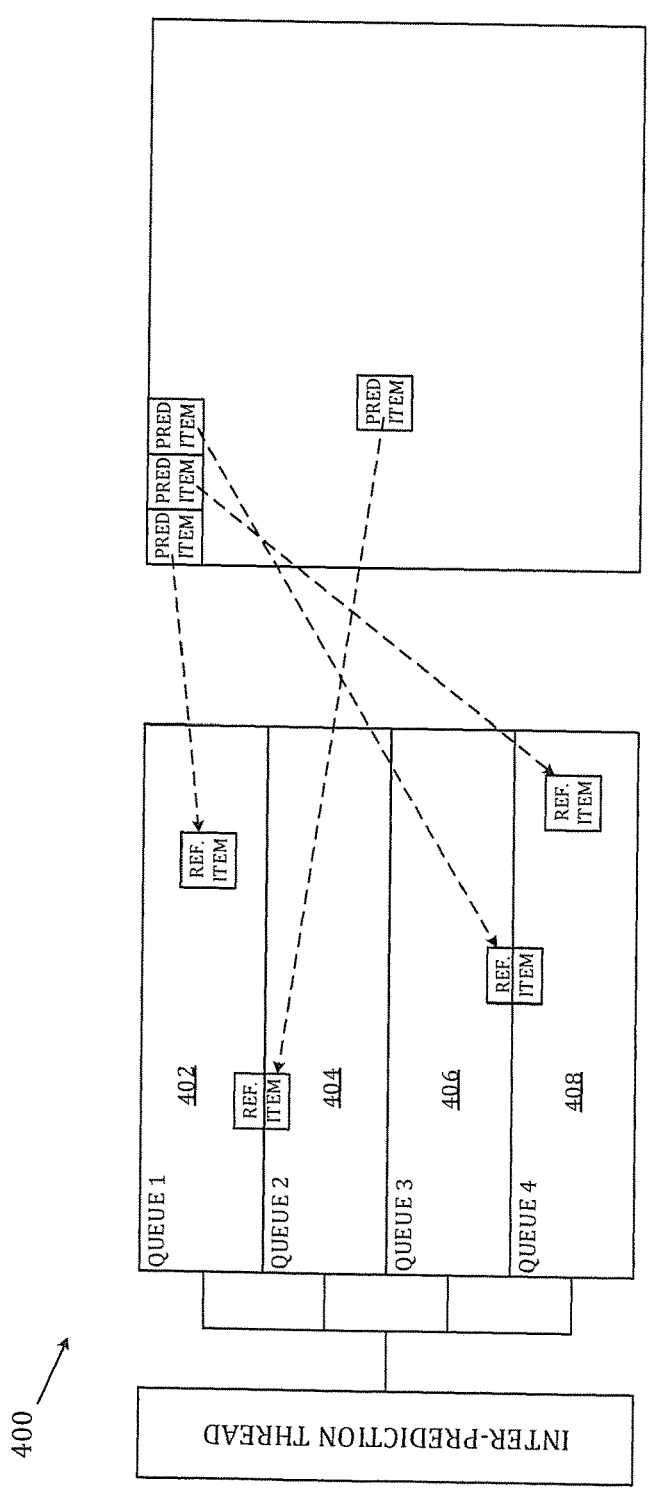
FIG. 4 is a schematic diagram illustrating the distribution of inter-prediction picture item data in queues in the method illustrated in FIG. 3.

The structures to organize inter-prediction item data to be decoded 400 (FIG. 4) may comprise respective queues 402, 404, 406, 408 of inter-prediction item data entities. Each inter-prediction item entity contains an identification of the relevant reference picture item data 104 that the inter-prediction module 208 uses in decoding the respective inter-coded picture item. The identification may include motion vector data, an index to the relevant reference picture item and a block size. The queues may be prioritized by the positions of the reference picture item data in decoding order. The control module 210 may control a syntax parser 212 that distributes the inter-prediction item entities to the queues according to the position in decoding order of the relevant reference picture item. The syntax parser 212 may use the position of the bottom right pixel as the reference picture item position.

The control module 210 may de-queue an inter-prediction picture item entity which the decoding module is to decode, and enqueue the inter-prediction item entity again if the relevant reference picture item data has not been decoded within a set time, and the decoding module decodes another inter-prediction item entity instead.

Each queue 402, 404, 406, 408 may contain inter-prediction item data for a respective region of the reference picture according to a decoding order. The decoding order may be raster scan order.

Where the picture data relates to slices or tiles of the picture, the queues may contain inter-prediction item data for one or more respective slices or tiles of the picture.

Where the decoding module comprises parallel decoding outputs, the inter-prediction item data for respective parallel decoding outputs may be interleaved in the same queues.

Figure 3:
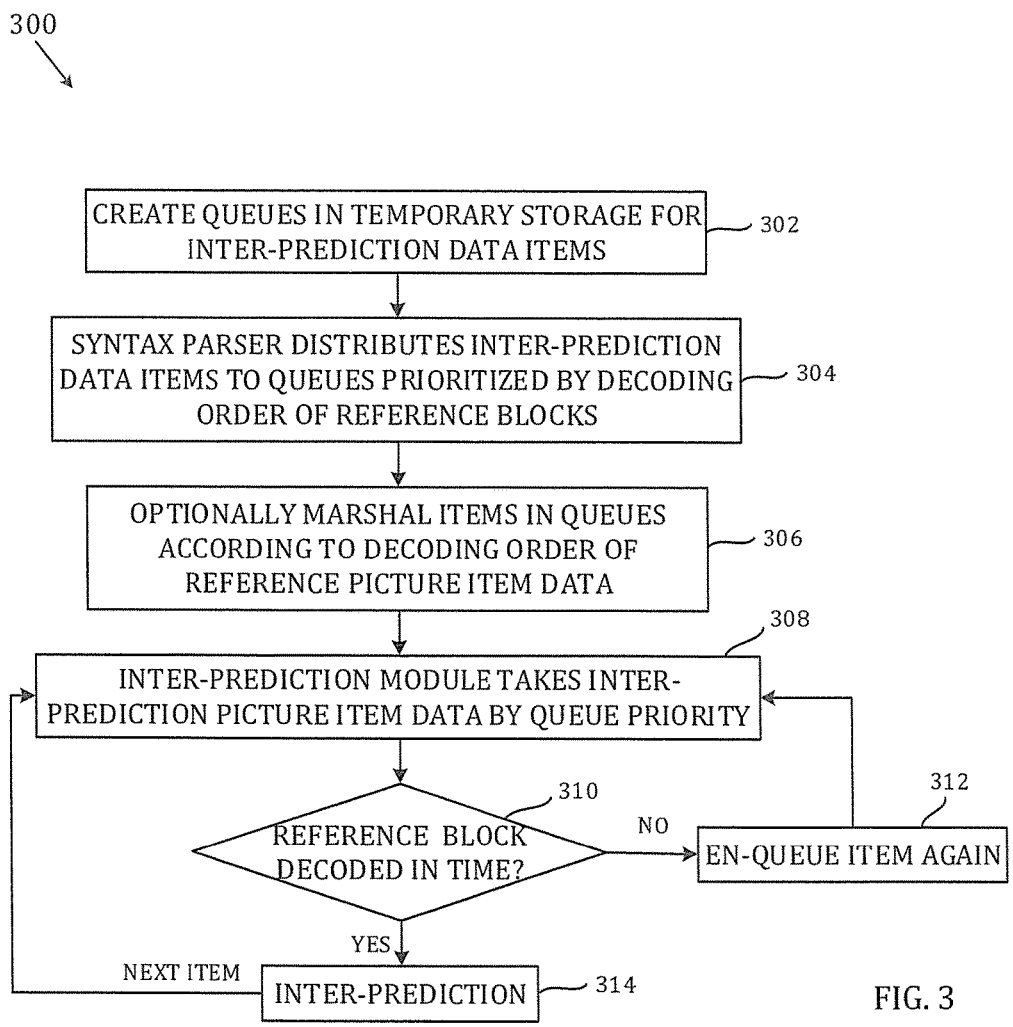
FIG. 3 is a flow chart of a method of operating the decoder of FIG. 2 in accordance with an embodiment of the invention.

FIG. 3 illustrates a method 300 of storing inter-prediction item data to be decoded in a queue structure 400. At 302 queues 402 to 408 are created in the temporary storage 204. At 304, the syntax parser 212 distributes the inter-prediction data items to the queues 402 to 408 prioritized by decoding order of the relevant reference blocks 104. Optionally, each queue 402 to 408 can be marshaled (sorted) according to the decoding order of the reference blocks in it for better efficiency, as at 306. The marshaling can be performed periodically or can be triggered when the number of items is greater than a threshold. At 308, inter-prediction threads in the inter-prediction module 208 take the items out of the queues 402 to 408 according to queue priority, taking the first item (if any) from the highest priority queue. At 310, a decision is taken whether the inter-prediction decoding cannot be completed because the relevant reference picture item data 104 has not yet been fully decoded. If the reference picture item data 104 has not been decoded in time, at 312, the inter-prediction data items are put back into the original queue. If the reference picture item data 104 has been decoded in time, at 314, the inter-prediction process is performed and the decoding process proceeds to the next item in the queue priority at step 308.

Figure 6:
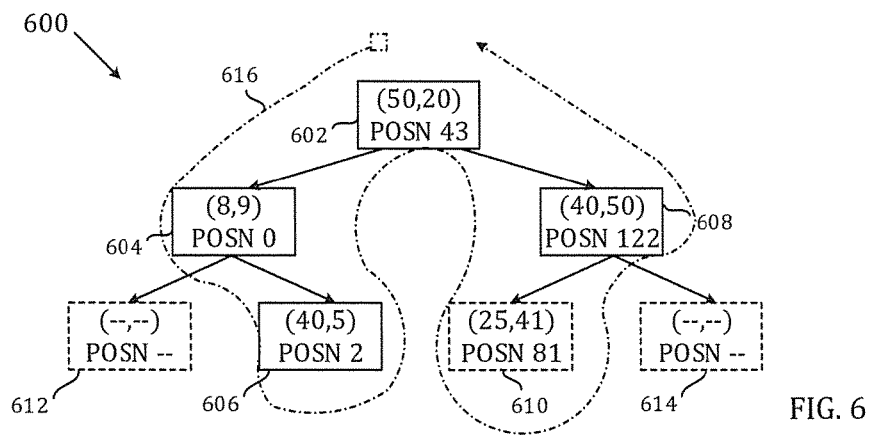
FIG. 6 is a schematic diagram illustrating the distribution of inter-prediction picture item data in trees in the method illustrated in FIG. 5.

The structures to organize inter-prediction item data to be decoded may comprise respective trees 600 (FIG. 6). Each tree has linked nodes 602 to 610 that contain inter-prediction item data entities and references to any child nodes, wherein the inter-prediction module extracts the inter-prediction item data entities by tree traversal 616 and uses the inter-prediction item data entities in decoding. Each inter-prediction item data entity contains an identification of the relevant reference picture item data 104. The identification may include motion vector data, an index to the relevant reference picture and a block size. The control module 210 may prioritize the structure of inter-prediction item data in the temporary storage 204 and the decoding order of stored inter-prediction item data by the order of traversal of the nodes 602 to 610. The inter-prediction module 208 may extract the inter-prediction item data entities by in-order tree traversal 616.

The control module 210 may insert the first inter-prediction item data entity in a tree as a root node 602, and subsequent inter-prediction item data entities as child nodes 604 to 610 in order of prioritization for decoding.

Alternatively, the control module 210 may insert a virtual item in a tree as a root node 602, and the inter-prediction item data entities as child nodes 604 to 610 in order of prioritization for decoding, which makes the tree more flat (balanced).

Figure 5:
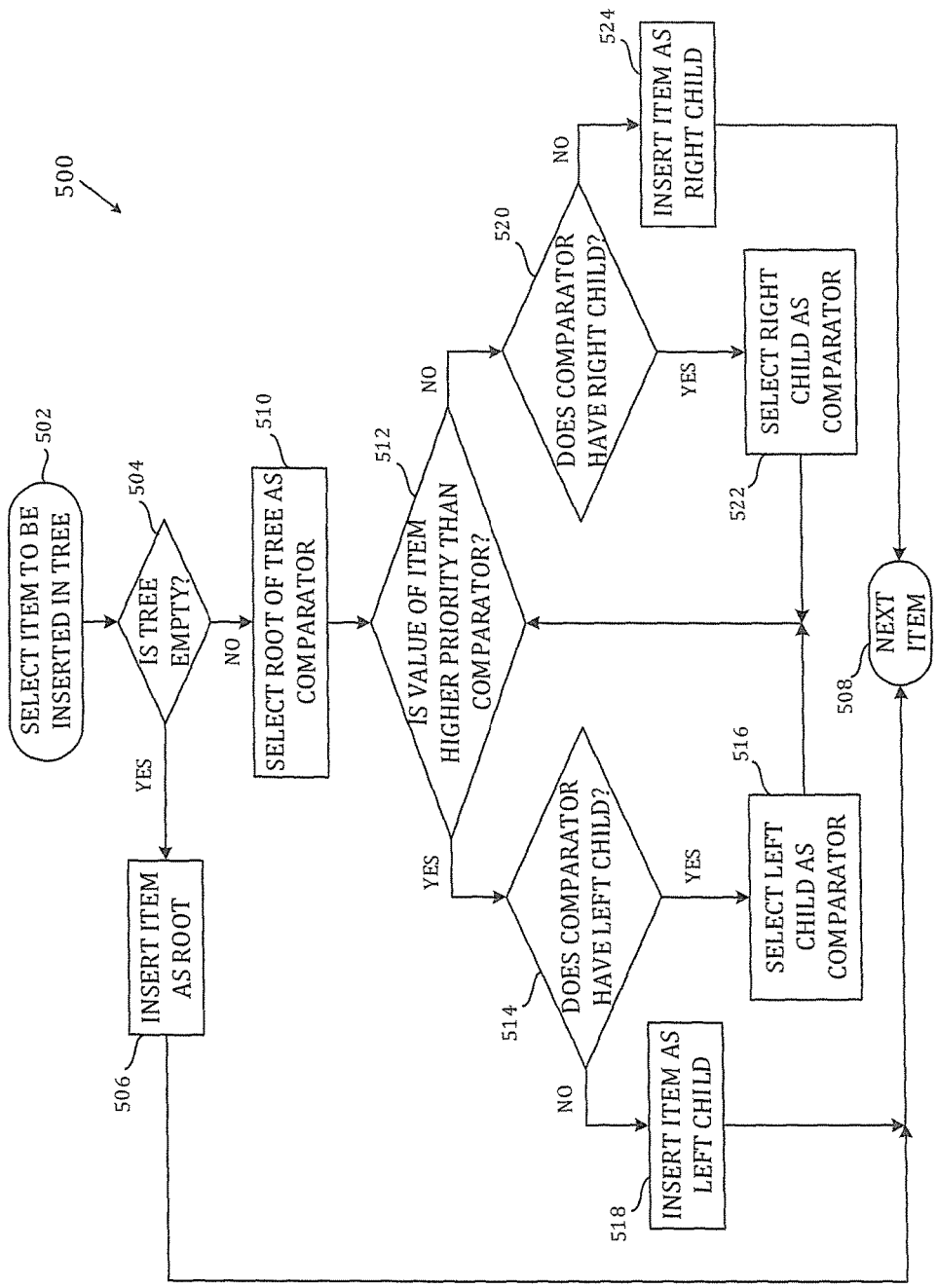
FIG. 5 is a flow chart of a method of operating the decoder of FIG. 2 in accordance with another embodiment of the invention.

FIG. 5 illustrates a method 500 of storing inter-prediction item data to be decoded in the tree structure 600. At 502, an inter-prediction item is selected for insertion in the tree 600. At 504, a decision is taken whether the tree 600 is empty. If so, the item is inserted as the root node 602 of the tree 600, and at 508 the process proceeds to the next item, reverting to step 502. If at 504 the tree is not empty, the root node 602 is selected as comparator at 510, and the item being inserted is a candidate for insertion as a child of the comparator. At 512, a decision is taken whether the value of the item has higher priority than the comparator node. If so, a decision is taken at 514 whether the comparator already has a left child (higher priority). If so, the left child already allocated is selected as comparator at 516 and the process reverts to step 512. If at 514 the comparator does not yet have a left child, the item is inserted at 518 as the left child node of the comparator. If at 512 the value of the item does not have higher priority than the comparator node, a decision is taken at 520 whether the comparator already has a right child (lower priority). If so, the right child already allocated is selected as comparator at 522 and the process reverts to step 512. If at 520 the comparator does not yet have a right child, the item is inserted at 524 as the right child node of the comparator.

In FIG. 6, the tree 600 is represented as a binary tree. The left child node 604 is the starting point for traversal 616 (illustrated by a chain-dotted line) of the tree. In conventional fashion, if the value of a child node is greater than the value of its parent node, it is shown to the right of the parent node while the child node is shown to the left of the parent node if its value is smaller (higher priority). In the tree 600, the value of a node is the position in the picture (or ID) of the corresponding macroblock (16×16 size, for example) that encloses the bottom right pixel (x, y) of the reference block, that is to say the position=(y/16)*(pic_width/16)+(x/16). In the tree 600, pic_width=640, position=(y/16)*40+(x/16). The node 610 (25, 41) position=81 is inserted as the left child of node 608. Nodes 612 and 614 have not been allocated yet and are shown in dashed lines. The order of tree traversal 616 is child nodes 604 (position 0), 606 (position 2), root node 602 (position 43), then child nodes 610 (position 81) and 608 (position 122).

It will be appreciated that other tree structures can be used and other tree traversal processes can be used.

Figure 7:
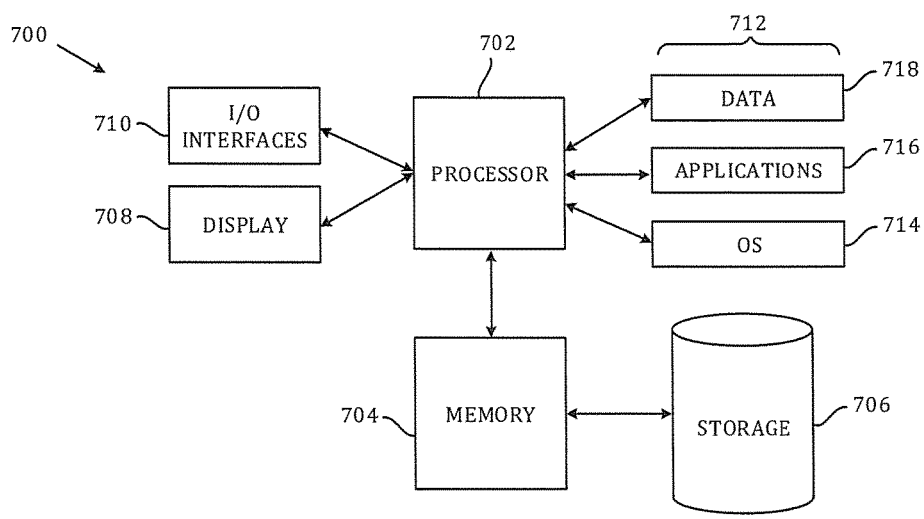
FIG. 7 is a schematic block diagram of a data processing system that may be used in implementing the parallel decoder of FIG. 2.

FIG. 7 is a schematic block diagram of a data processing system 700 that may be used in implementing the parallel decoder. The data processing system 700 includes a processor 702 coupled to a memory 704, which may provide the temporary storage 204 of the parallel decoder 200, and additional memory or storage 706 coupled to the memory 704. The data processing system 700 also includes a display device 708, which may be the display screen 214 that displays the reconstructed picture data, input/output interfaces 710, and software 712. The software 712 includes operating system software 714, applications programs 716, and data 718. The data processing system 700 generally is known in the art except for the algorithms and other software used to implement the decoding of compressed video picture data described above. When software or a program is executing on the processor 702, the processor becomes a "means-for" performing the steps or instructions of the software or application code running on the processor 702. That is, for different instructions and different data associated with the instructions, the internal circuitry of the processor 702 takes on different states due to different register values, and so on, as is known by those of skill in the art. Thus, any means-for structures described herein relate to the processor 702 as it performs the steps of the methods disclosed herein.

The invention may be implemented at least partially in a non-transitory machine-readable medium containing a computer program for running on a computer system, the program at least including code portions for performing steps of a method according to the invention when run on a programmable apparatus, such as a computer system or enabling a programmable apparatus to perform functions of a device or system according to the invention.

The computer program may be stored internally on computer readable storage medium or transmitted to the computer system via a computer readable transmission medium. All or some of the computer program may be provided on non-transitory computer-readable media permanently, removably or remotely coupled to an information processing system. The computer-readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM and so on; and data transmission media including computer networks, point-to-point telecommunication equipment, and carrier wave transmission media, just to name a few.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A parallel decoder for decoding compressed video picture data including inter-coded picture item data with motion vector data, the decoder comprising:
   a temporary storage for storing a plurality of structures of picture data to be decoded including structures to organize inter-prediction items;
   at least one decoding module for decoding the stored picture data, wherein the at least one decoding module includes at least one inter-prediction module that uses inter-prediction item data to decode an inter-coded picture item by referring to already decoded reference picture item data; and
   a control module that controls the structure of inter-prediction item data in the temporary storage as a function of positions in a decoding order of corresponding reference picture items, and prioritizes a decoding order of stored inter-prediction item data by the at least one inter-prediction module as a function of the decoding order of the reference picture item data, wherein the structures to organize inter-prediction items to be decoded comprise respective queues of inter-prediction item data entities, wherein each inter-prediction item data entity contains an identification of the relevant reference picture item data that the at least one inter-prediction module uses to decode the respective inter-coded picture item, wherein the structures of picture item data to be decoded comprise respective trees, each tree having linked nodes that contain inter-prediction item data entities and references to any child nodes, wherein the inter-prediction module extracts the inter-prediction item data entities by tree traversal and uses the inter-prediction item data entities in decoding.

2. The parallel decoder of claim 1, wherein the identification of the relevant reference picture item data includes motion vector data, an index to the relevant reference picture and a block size.

3. The parallel decoder of claim 1, wherein the queues are prioritized by the positions of the reference picture item data in decoding order.

4. The parallel decoder of claim 3, further comprising a syntax parser, in communication with the control module, that distributes the inter-prediction item entities to the queues according to the position in decoding order of the relevant reference picture item.

5. The parallel decoder of claim 4, wherein the syntax parser uses the position of the bottom right pixel as the reference picture item position.

6. The parallel decoder of claim 1, wherein each queue contains picture inter-prediction item data for a respective region of the reference picture according to the decoding order.

7. The parallel decoder of claim 1, wherein each queue contains picture inter-prediction item data for a respective region of the reference picture according to raster scan order.

8. The parallel decoder of claim 1, wherein the picture data relates to one of slices and tiles of the picture, and the queues contain inter-prediction item data for respective slices or tiles of the picture.

9. The parallel decoder of claim 1, wherein the decoding module comprises parallel decoding outputs, and the inter-prediction item data for respective parallel decoding outputs are interleaved in the same queues.

10. The parallel decoder of claim 1, wherein the identification of the relevant reference picture item data includes motion vector data, an index to the relevant reference picture and a block size.

11. The parallel decoder of claim 1, wherein the control module prioritizes the structure of inter-prediction item data in the temporary storage and the decoding order of stored inter-prediction item data by the order of traversal of the nodes.

12. The parallel decoder of claim 1, wherein the control module inserts a first inter-prediction item data entity in a tree as a root node, and subsequent inter-prediction item data entities as child nodes in order of prioritization for decoding.

* * * * *